Oct. 16, 1951  W. GREENWOOD  2,571,569
COMBINED SQUARE AND TAPE MEASURE
Filed Nov. 29, 1948  2 SHEETS—SHEET 1
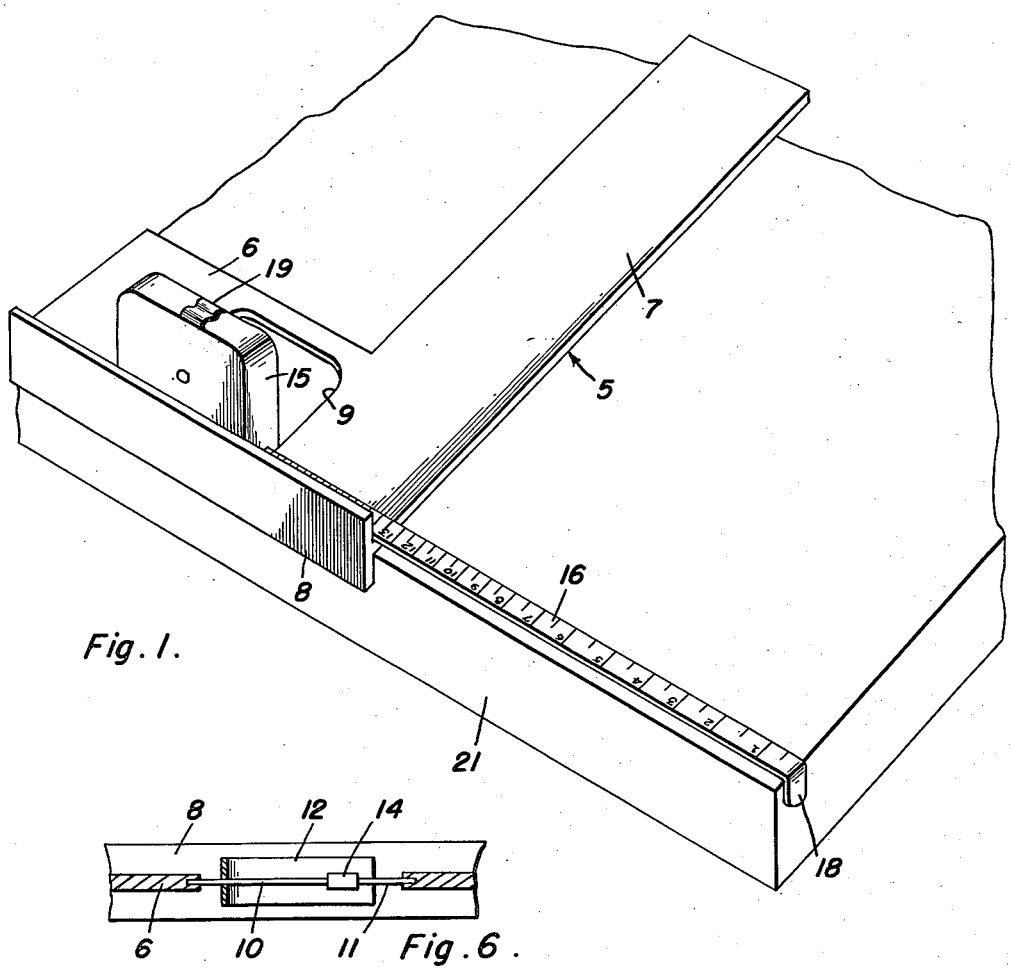
Walter Greenwood
INVENTOR.
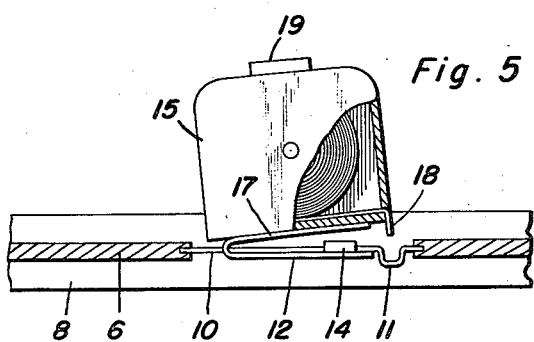

Oct. 16, 1951    W. GREENWOOD    2,571,569
COMBINED SQUARE AND TAPE MEASURE
Filed Nov. 29, 1948    2 SHEETS—SHEET 2
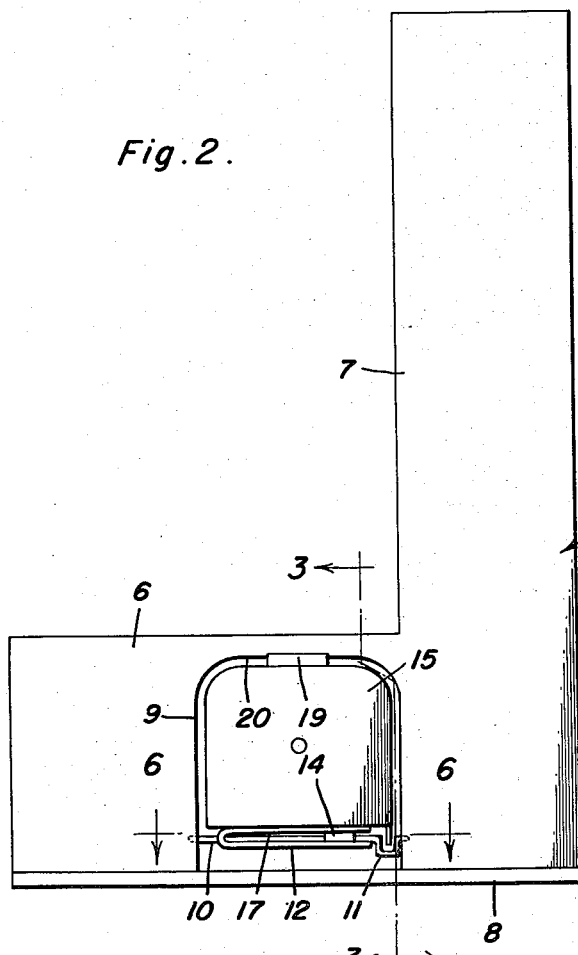
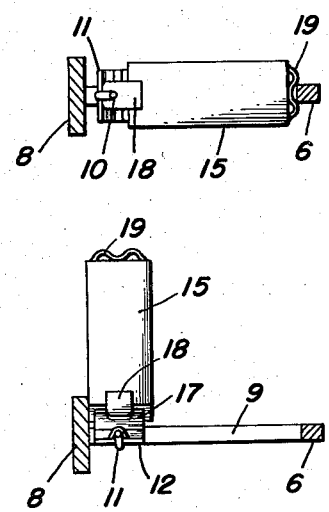
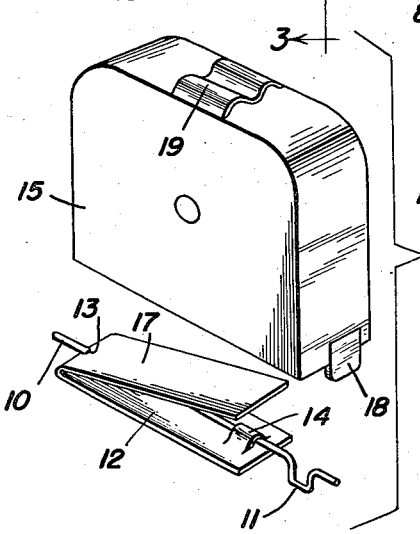
Walter Greenwood
INVENTOR.

Patented Oct. 16, 1951

2,571,569

UNITED STATES PATENT OFFICE 2,571,569

COMBINED SQUARE AND TAPE MEASURE

Walter Greenwood, Madison, N. J., assignor of one-half to Richard Edward Allen, South Orange, N. J.

Application November 29, 1948, Serial No. 62,474

6 Claims. (Cl. 33—75)

The present invention relates to new and useful improvements in squares and tape measures, and more particularly to means for combining the square and tape measure in a unitary structure in order that the tape measure may at all times be available for use with the square.

An important object of the invention is to provide novel means for swingably mounting the housing of a spring-retracted tape measure to a square for using the tape measure at either side of the square and for locking the housing of the tape measure in a collapsed, compact form when not in use.

A further object of the invention is to provide a tool of this character of simple and practical construction, which is neat and attractive in appearance, efficient and reliable in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view showing the combined square and tape measure in use;

Figure 2 is a top plan view showing the tape measure locked in collapsed position in the square;

Figure 3 is a sectional view taken on the line 3—3 of Figure 2 and showing the tape measure in its locked position;

Figure 4 is a similar view showing the tape measure in its released position for use;

Figure 5 is a fragmentary sectional view of the square showing the spring mounting for raising the housing of the tape measure;

Figure 6 is a fragmentary sectional view taken substantially on a line 6—6 of Figure 2; and Figure 7 is a group perspective view of the housing for the tape measure and spring mounting therefor.

Referring now to the drawings in detail, wherein for the purpose of illustration I have disclosed a preferred embodiment of the invention, the numeral 5 designates generally a carpenter's square including a relatively short arm 6 and relatively long arm 7 positioned at right angles to each other. The outer edge of the short arm 6 is provided with a flange 8 projecting above and below the surface of the square.

The short arm 6 is formed with an opening 9 with one edge of the opening in the plane or in alignment with the inner edge of the long arm 7, as shown in Figure 2 of the drawing.

A wire pivot pin 10 is rockably supported in the opening 9 in a position parallel to flange 8 and is formed adjacent one end with an offset or crank portion 11. A V-shaped leaf spring 12 is formed with an opening 13 at its closed end for rotatably receiving pin 10, and a bearing 14 is provided on the inner face of one leg of the leaf spring adjacent its open end and in which the pin is also rockably received.

The bottom of a housing 15 for a spring-retracted tape measure 16 is suitably secured to the outer surface of the other leg 17 of the leaf spring, the outer end of the tape measure being provided with a hook 18.

The tape measure housing 15 is positioned in the opening 9 and swingably connected to pin 10 for swinging into a position at either side of the short arm 6 of the square, and the top of the housing 15 is formed or provided with a spring catch 19 for engaging the edge 20 of opening 9 to lock the housing in a stationary position in the opening.

In the operation of the device, the tape measure housing 15 is mounted in position in opening 9 to enable pulling of the tape measure 16 outwardly beyond the outer edge of long arm 7 of the square and at right angles thereto, as shown in Figure 1 of the drawings. By placing the square 5 on one surface of the work 21 with the flange 8 against one edge of the work, the hook 18 of the tape measure may be pulled outwardly and engaged over one end of the work and the square 5 moved along the surface of the work to set the square a predetermined distance from the end of the work, and the work may be marked at either its inner or outer edges. The spring 12 raises the tape measure housing 15 upwardly, as shown in Figure 5 of the drawing, to place the hook 18 in easy-gripping position to pull the tape outwardly.

After the desired mark has been made on the work, the hook 18 is released and retracted in housing 15 and the housing swung downwardly in opening 9 and locked by catch 19. The offset 11 receives hook 18 to prevent interference with the pin 10 when the housing is closed.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even

Though there is herein shown and described a preferred embodiment of the invention, the same is susceptible to certain changes fully comprehended by the spirit of the invention as herein described and within the scope of the appended claims.

Having described the invention, what is claimed as new is:

1. In combination, a square having an opening, a tape measure positioned in the opening, and mounting means for the tape measure in the opening and swingably supporting the tape measure for movement into a position at either side of the square, said tape measure including a housing and said mounting means comprising a supporting member in the opening, and a resilient member connecting the tape measure housing to the supporting member and yieldingly urging the tape measure housing in an upwardly inclined position from said member.

2. In combination, a square having an opening, a tape measure positioned in the opening, and mounting means for the tape measure in the opening and swingably supporting the tape measure for movement into a position at either side of the square, said tape measure including a housing and said mounting means comprising a supporting member in the opening, and a V-shaped spring connected at one of its diverging arms to the housing and connected at its other diverging arm to the supporting member to hold the tape measure housing in an upwardly inclined position from said member.

3. In combination, a square having an opening, a tape measure positioned in the opening, and mounting means for the tape measure in the opening and swingably supporting the tape measure for movement into a position at either side of the square, said mounting means comprising a supporting member in the opening, and resilient means between the tape measure and the supporting member yieldingly urging the tape measure above the upper surface of the square.

4. A tape measure holder comprising a flat plate having a transverse opening therethrough, a tape measure including a housing therefor, means pivotally mounting said housing in said opening for outward swinging movement of said housing from said opening to a raised position vertical to said plate, and means for releasably latching said housing in a lowered position in said opening, said first means including a supporting member in said opening, said latching means including a V-shaped spring connected at one of its diverging arms to the housing and connected at its other diverging arm to the supporting member, and a catch on said housing for engaging said plate.

5. In a tape measure holder, a substantially flat member having a transverse opening therethrough, a tape measure housing disposed in the opening, means for pivotally mounting the housing on the member for swinging movement about an axis parallel to the member and adjacent one side of the housing, and means for yieldingly urging movement of the housing away from said axis and into frictional engagement with the member, whereby the housing is releasably retained in the opening and may be swung outwardly from the opening.

6. In a tape measure holder, a substantially flat member having a transverse opening therethrough, a tape measure housing disposed in the opening, means for pivotally mounting the housing on the member for swinging movement about an axis parallel to the member and adjacent one side of the housing, and means for yieldingly urging movement of the housing away from said axis and into frictional engagement with the member, said first mentioned means including a pivot pin carried by the member and defining said axis, and said second mentioned means including a resilient element connecting the pin to the housing and biasing the same apart.

WALTER GREENWOOD.

REFERENCES CITED

The following references are of record in the file of this patent:

UNITED STATES PATENTS

| Number | Name | Date |
| --- | --- | --- |
| 491,733 | Foster | Feb. 14, 1893 |
| 501,774 | Dunnington | July 18, 1893 |
| 530,111 | Krebs | Dec. 4, 1894 |
| 733,302 | Van Court | July 7, 1903 |
| 825,217 | Hull et al. | July 3, 1906 |
| 1,106,152 | McIntosh | Aug. 4, 1914 |
| 1,638,914 | Brush | Aug. 16, 1927 |
| 1,690,919 | Baine | Nov. 6, 1928 |

FOREIGN PATENTS

| Number | Country | Date |
| --- | --- | --- |
| 404,043 | Great Britain | Jan. 11, 1934 |